Oct. 2, 1945. R. M. HVID 2,386,117
ENGINE PISTON CONSTRUCTION
Filed Dec. 29, 1943
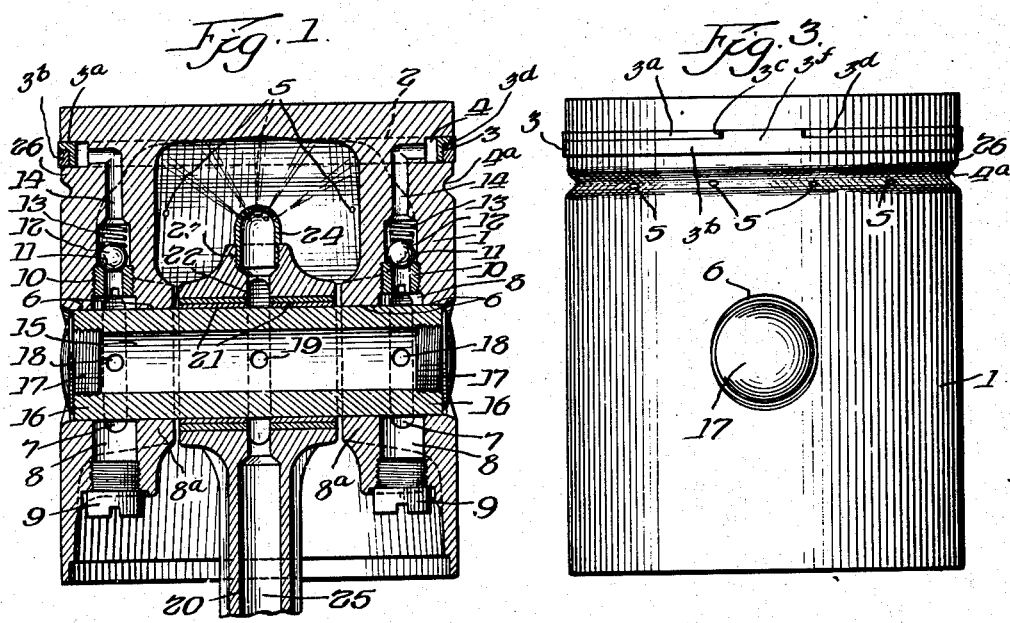
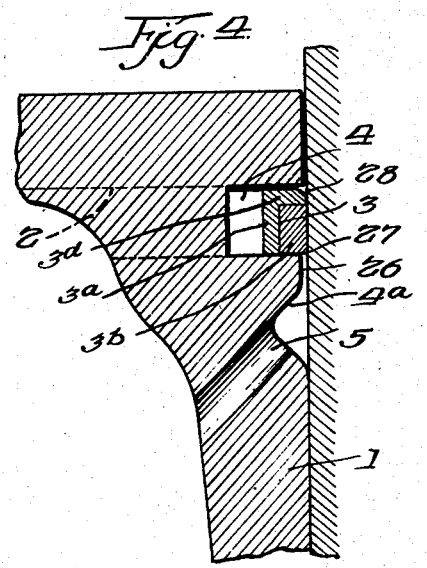
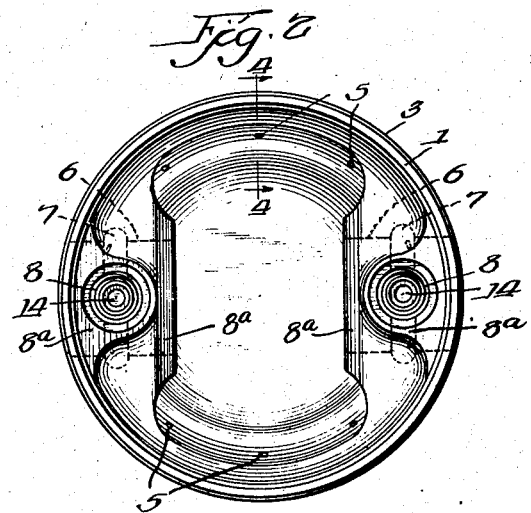
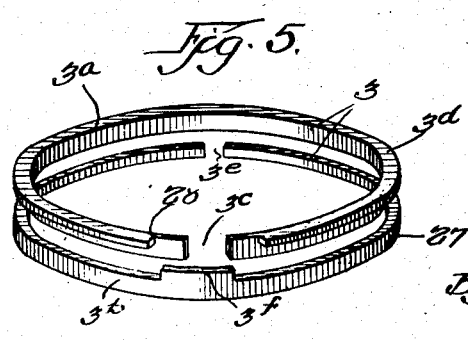
Inventor:
Rasmus M. Hvid
By Thiess, Olson & Mecklenburger
Attys.

Patented Oct. 2, 1945

2,386,117

UNITED STATES PATENT OFFICE 2,386,117

ENGINE PISTON CONSTRUCTION

Rasmus M. Hvid, Wilmette, Ill.

Application December 29, 1943, Serial No. 516,000

18 Claims. (Cl. 309—7)

My invention relates to engine pistons and more particularly to pistons for internal combustion engines and for other types of machinery in which cylinders and pistons are employed in connection with the compressing or expanding of gases.

In the following description, my invention is illustrated and explained in connection with a piston designed for use in a four stroke cycle internal combustion engine of the vertical type with the cylinder above the crankshaft, but it is obvious that my invention may be utilized in other forms of engines or motors.

The present practice is to equip pistons with several suitably designed and manufactured piston rings. These rings are placed in grooves cut in the outer circumference of the piston and are located near the upper, or head, end of the piston. The rings are designed to exert sufficient outward radial pressure on the interior surface of the cylinder wall so as to prevent gas from passing between the outer surfaces of the rings and the cylinder inner surface at all times when the engine is in operation. In addition to the use of these piston rings, one or more suitably designed oil scraper rings are also generally applied to the piston. The oil scraper rings are placed in grooves, similar to the grooves receiving the piston rings, but which are nearer to the lower, or open, end of the piston head. It is the function of the oil scraper rings to scrape off the excess lubricating oil from the interior surface of the cylinder, thus preventing the oil, as far as possible, from being carried into the combustion space of the cylinder by the motion of the piston, and to return this oil to the crankcase of the engine for re-use.

Experience has shown that the pistons of the prior art, as described above, are faulty in that there are no pistons in use, as far as I am aware, of which it can be said that they are perfectly gastight, or substantially gastight, in operation over an extended period of use. One of the principal reasons for this fault is that in pistons as now manufactured it is impossible to prevent gas during the compression and power strokes of the pistons from passing between the top horizontal surface of the piston ring and the subtending top surface in the ring groove and into the clearance space on the inside of the piston ring, and from there escaping under the piston ring and between its bottom surface and the subtending bottom surface in the ring groove to the low pressure side of the piston ring. Increasing the number of piston rings used on a piston obviously improves, but does not eliminate, the aforementioned defect. The piston ring nearest the top of the head of the piston is that which causes the most trouble. Being located in the highest and hottest portion of the piston and exposed directly to the burning gases, it is not possible to lubricate this topmost ring properly. Tests have shown that the unit pressure on the inside arcuate surface of this ring follows closely the unit gas pressure in the cylinder. The result is, therefore, that at the early part of the power stroke this ring is forced radially against the interior surface of the cylinder wall by a very high gas pressure, and as lubrication at this part of the piston stroke is practically nonexisting, the ring, the ring groove and the cylinder wall are subject to very great wear. The present invention corrects the defects described above. Other advantages of my invention will be pointed out hereinafter.

For a better understanding of the nature and scope of my invention, reference may be had to the following description and the accompanying drawing, wherein Fig. 1 is a view, partially in elevation and partially in cross section, of a piston embodying one form of my invention, this view being taken through the center line of the wrist pin;

Fig. 2 is a plan view of the bottom of the piston of Fig. 1 showing the open end and inner contours, bosses and bores;

Fig. 3 is a side elevation of the piston taken at 90° to the view of Fig. 1;

Fig. 4 is an enlarged cross-sectional view, taken on the line 4—4 on Fig. 2; and Fig. 5 is an exploded perspective view of a composite piston ring which is suitable for use with the piston of my present invention. Other types of piston rings are also suitable.

Referring to the figures, 1 is the piston. 2 is the piston ring groove. 3 is the piston ring. 4 is the clearance space in the piston ring groove inside the piston ring 3. 4a is a peripheral groove, preferably rounded in cross section, turned on the outer circumference of the piston 1 which, together with drilled holes 5, best shown in Fig. 3, serves as means for drainage of excess lubricating oil scraped off the interior surface of the cylinder wall by the piston ring 3. 6 and 6 are the bearings in the piston for a hollow wrist pin 16. 7 and 7 are annular oil grooves cut in the bearings 6 and 6 and surrounding the wrist pin 16. 8 and 8 are vertical bores formed in wrist pin bosses 8a on the piston. 9 and 9 are screw plugs tightly closing the bores 8 and 8, as shown in Fig. 1. 10 and 10 are annularly shaped screw plugs tightly fitting threads formed in the bores 8 and 8, as shown in Fig. 1. 11 and 11 are valve seats, formed on the top of the screw plugs 10 for ball check valves 12 and 12. The valve seats 11 are formed on the edges of the central holes in the screw plugs 10 and 10. 13 and 13 are springs which normally press the ball check valves 12 and 12 against their valve seats 11—11. 14 and 14 are drilled passages connecting the spaces above and surrounding the ball check valves 12 and 12 with the clearance space 4 inside of the piston ring 3.

The interior space 15 formed in the hollow wrist pin 16 is tightly closed by screw plugs 17 and 17. Through the wall of the hollow wrist pin 16 are drilled oil holes 18, 18 and 19. Oil holes 18 and 18 connect the hollow space 15 in the wrist pin with the annular grooves 7 and 7. The oil hole 19 is located midway between the ends of wrist pin 16. The wrist pin 16 has a so-called floating fit in wrist pin bearings 6 and 6 in the piston.

Only the piston end of a connecting rod 20 is illustrated in Fig. 1, as that part only is required for describing my invention. The connecting rod 20 is fitted with a wrist pin bearing 21 of the usual type and having a running fit on the hollow wrist pin 16. Midway from both ends of this bearing and communicating with the hole 19, an annular groove 22 is cut in the boss of the rod 20. This groove surrounds the wrist pin, and a threaded opening 23 is made in the top end of the connecting rod 20 which opens into the annular groove 22. A spray nozzle 24 is screwed into threaded opening 23 as shown.

A drilled hole 25 is formed in the connecting rod 20 that extends from the crank pin bearing in the lower end of the rod, not shown, into the annular groove 22.

It is apparent that except when ball check valves 12 and 12 are spring-pressed onto their valve seats 11 and 11, there is a clear passage from the crank pin bearing in the lower end of the connecting rod 20 to the clearance space 4 on the inside of the piston ring 3, this passage comprising the hole 25, the hole 19, the chamber 15, the holes 18, the bores 8, and the bores 14.

Referring to Fig. 4, this illustration shows certain details of the piston head on a larger scale. At 26 is indicated that the outside diameter of the piston 1 is there somewhat reduced. This is done in order that excess oil on the interior surface of the cylinder wall, scraped off by the sharp corner 27 on piston ring 3, may find room enough to flow into groove 4a for return to the engine crankcase through the drain holes 5. Edge 28 on the piston ring is suitably rounded or beveled in order that the piston ring 3, when the piston moves upwards in the cylinder, will not scrape the lubricating oil film off the inner cylinder surface, but will glide on it with minimum friction.

Having now described the piston and details embodying my invention, it is readily understood that when the engine is in operation the engine's lubricating oil pump (not shown) forces lubricating oil from the crank pin bearing to the wrist pin bearings through drilled hole 25 in the connecting rod 20. A part of the oil thus supplied under pressure is diverted to the spray nozzle 24 and by means of same is sprayed onto the interior hot surface of the piston head, in order to control its temperature to a lower degree than would otherwise obtain.

Another part of the oil supply is forced upwardly through the openings 18—18 and into the bores 8 and 8 and when, during each power cycle in the engine the resistance to opening is less than the force or pressure of the oil to open the ball check valves 12 and 12, said check valves open and permit the oil to pass on through the drilled passages 14 and 14 into the clearance space 4 adjacent to the inside surface of the piston ring 3.

During the period in the power cycle in which the gas pressure in the cylinder exceeds the pressure of the oil entering clearance space 4, check valves 12 and 12 of course remain closed, thus locking a body of oil in the clearance space 4. The gas pressure now acts upon the oil contained in the clearance space 4 by entering into space 4 through the small clearance between the upper face of piston ring 3 and its adjacent face in the ring groove, thus forcing a filmlike quantity of oil from clearance space 4 through the small clearance between the lower ring face and its adjacent face in the ring groove and onto the inner surface of the cylinder.

It is intended that the volume of clearance space 4 be determined in such a manner that during the operation of the engine a certain amount of oil will always remain in it after a discharge period. As the gas pressure can only enter clearance space 4 over the upper face of the piston ring 3, it is therefore now impossible for gas to pass by the piston ring by going through the clearance space 4 on the inside of the ring and escaping under the ring 3.

During the period in the power cycle in which the gas pressure in the cylinder is low, so that the oil pressure under check valves 12 and 12 is greater than the load on top of these valves, oil under pressure passes by the then open ball check valves 12 and enters the clearance space 4, thus filling it and exerting an outward radial pressure upon the inside of the piston ring 3. Oil leakage from clearance space 4, due to the oil pressure obtaining in this space, can now take place over and under the piston ring 3 and onto the interior surface of the cylinder wall. It will be observed that also during this period in the power cycle there is no opportunity for gas leakage past the piston ring 3. It is obvious that machinery employing cylinders with pistons and details embodying my invention will be substantially gas tight in operation.

Thorough lubrication of the piston, piston ring, ring groove and interior surface of the cylinder is obtained by means of the present invention and the cooling and cleaning effect of the lubricating oil supplied in the manner described is greatly beneficial to good operation and long wear. Introducing a body of oil in the space 4 around the piston ring 3 cushions the ring so that it cannot hammer the sides of the piston ring groove when it changes position during operation. Reference should also be made here to Fig. 4 of the drawing. The edge 27 on piston ring 3 is shown as being sharp. This is done so that the piston ring will act as an oil scraper ring on the downstroke of the piston and scrape off excess oil, if any, from the interior surface of the cylinder and return such oil to the crankcase for re-use through the groove 4a and the oil drain holes 5. The upper edge 28 on the piston ring 3 is shown suitably rounded or beveled. The purpose of this is to permit the piston ring 3 on the upward stroke of the piston to glide on the oil film on the interior cylinder surface so as to prevent the ring 3 from pushing such oil up into the combustion space of the cylinder.

The piston ring 3 shown in Fig. 5 is a composite ring made up of two arcuate sections 3a and 3b. The section 3a is split at 3c and is provided with an outwardly extending flange 3d. This flange does not quite extend at both of its ends to the split 3c. The upper edge of the flange 3d is beveled as shown at 28 in Fig. 4. The section 3b, which may be designated the sealing ring, is likewise split at 3e and is provided with an upstanding portion 3f opposite to the split 3e. The arcuate section 3b embraces the arcuate section 3a and the upstanding portion 3f of the former is so fitted with respect to the section 3a that the portion 3f closes the split 3c and the two spaced ends of the flange 3d. The lower end of the section 3b is provided with a sharp edge 21 as explained above in connection with Fig. 4. It is to be understood that my invention is not limited to a piston ring such as shown in Fig. 5 because many other suitable forms of piston rings may be employed other than the one shown in detail in this figure.

Referring to Fig. 1, the piston rod 20 is not necessarily formed with a hollow space 25, and the nozzle 24, designed to spray the head of the piston with cooling oil, may be eliminated. Other suitable means, as one skilled in the art will know, may be provided for conveying oil to the hollow interior 15 of the wrist pin 16 and in this event, the hole 19 may be eliminated. Oil being delivered to this hollow space 15 in any suitable fashion will flow through the openings 18 as hereinbefore described. It is to be understood, therefore, that my invention is not to be limited to a piston construction wherein the spray nozzle 24 and the hollow piston rod 20 necessarily form a part thereof.

It was mentioned earlier in this description that a piston ring of the usual type, when in place, is made in such a manner that it exerts a suitable radial outward pressure upon the interior surface of the cylinder. Such a ring must therefore possess initial tension in the ring material, or else be backed up with some form of mechanical spring device. Both methods are objectionable for various reasons. In my present invention the initial tension in the piston ring 3 is of secondary importance, in fact, it may preferably be relatively low because, as previously explained, when the engine is in operation, the ring is forced outwardly against the inner cylinder surface by the pressure existing in the body of oil contained in clearance space 4. The ring material may thus be selected from the standpoint, for instance, of resistance to wear and to heat, rather than from the standpoint of spring tension. It is also possible to use a piston ring, the thickness of which in a radial direction is less than normally required, thus facilitating its installation in the ring groove and minimizing the danger of distortion of the ring.

While the invention has been described in connection with a four stroke internal combustion engine, it must be clear that it may with advantage be incorporated in many other classes of machinery, and I do not wish to be limited in any way except by the appended claims.

I claim:

1. A piston construction comprising a piston head having a peripheral groove formed on the exterior surface thereof, a resilient piston ring held within said groove, the exposed side of said ring being adapted to slidingly engage the inner surface of the cylinder wherein the piston is to operate, the radial depth of said peripheral groove being such as to provide an annular oil chamber surrounding the rear side of said piston ring, a wrist pin providing a closed oil chamber therein and connecting the piston to the piston rod, the piston head having a passageway formed therein connecting the said annular oil chamber to the oil chamber housed in said wrist pin, and a one way check valve disposed in said passageway to allow the flow of oil into said annular oil chamber from said oil chamber housed in the wrist pin whereby the said annular oil chamber is filled with oil during operation of the piston, said valve locking a body of oil in said annular oil chamber when the gas pressure in the cylinder exceeds the pressure exerted on the body of oil contained in the chamber housed in the wrist pin.

2. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder ring the piston is to operate, the radial depth of said peripheral groove being such as to provide an annular oil chamber surrounding the rear side of said piston ring, and means for locking a body of lubricating oil under pressure to fill said annular chamber therewith when the gas pressure in the cylinder housing the piston exceeds the pressure of the oil that lubricates the engine.

3. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder ring the piston is to operate, the radial depth of said peripheral groove being such as to provide an annular oil chamber surrounding the rear side of said piston ring, and a one way check valve housed in the piston head for locking a body of lubricating oil to fill said annular chamber therewith during the power stroke of the piston, said body of oil in said annular chamber serving to seal the gas under pressure above the piston head which gas then forces a film of lubricating oil from said annular oil chamber through the clearance between the said piston ring and piston upon the inner surface of the cylinder wall.

4. A piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder ring the piston is to operate, the radial depth of said peripheral groove being such as to provide an annular oil chamber surrounding the rear side of said piston ring, a hollow wrist pin providing a confined oil chamber therein and connecting the piston to the piston rod, diametrically opposed passageways being formed in the piston head connecting the said annular oil chamber to the oil chamber housed in said wrist pin, and a one way check valve disposed in each of said passageways to allow the flow of oil therethrough into said annular oil chamber from said oil chamber housed in the wrist pin whereby the said annular oil chamber is filled with oil during operation of the piston, said valves locking a body of oil in said annular oil chamber to fill completely the latter when the gas pressure in the cylinder exceeds the pressure exerted on the body of oil contained in the chamber housed in the hollow wrist pin.

5. A piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder ring the piston is to operate, the radial depth of said peripheral groove being such as to provide an annular oil chamber surrounding the rear side of said piston ring, a hollow wrist pin providing a confined oil chamber therein and connecting the piston to the piston rod, diametrically opposed passageways being formed in the piston head connecting the said annular oil chamber to the oil chamber housed in said wrist pin, a one way check valve disposed in each of said passageways to allow the flow of oil therethrough into said annular oil chamber from said oil chamber housed in the wrist pin whereby the said annular oil chamber is filled with oil during operation of the piston, said valves locking a body of oil in said annular oil chamber to fill completely the latter when the pressure in the cylinder exceeds the pressure exerted on the body of oil contained in the chamber housed in the hollow wrist pin, and a spray nozzle mounted on the end of the piston rod which is adjacent to the piston head, said spray nozzle communicating with the oil chamber housed in said hollow pin whereby a cooling body of oil is sprayed on the inner surface of the piston head during the power stroke of the piston.

6. A piston construction comprising a hollow piston head having a peripheral groove formed on the exterior surface of the side wall of said piston head, a resilient piston ring held within said groove, the exposed side of said ring being adapted to slidingly engage the inner surface of the cylinder wherein the said piston is to operate, the radial depth of said peripheral groove being such as to provide an annular oil chamber surrounding the rear side of said piston ring, a piston rod, a wrist pin providing a confined oil chamber therein and connecting the piston head to the piston rod, a plurality of passageways being formed in the hollow piston head connecting the said annular oil chamber to the oil chamber housed in said wrist pin, and a one way check valve disposed in each of said passageways to allow the flow of oil therethrough into said annular oil chamber from said oil chamber housed in the wrist pin whereby the said annular oil chamber is filled with oil during operation of the piston, said valves locking a body of oil in said annular oil chamber to fill completely the latter when the pressure in the cylinder exceeds the pressure exerted on the body of oil contained in the chamber housed in the wrist pin, said body of oil contained in said annular chamber serving to lubricate with an oil film the inner surface of the cylinder wall when the gas pressure above the piston head forces oil through the clearance between the said piston ring and piston head.

7. A piston construction comprising a hollow piston head having a peripheral groove formed on the exterior surface of the side wall of said piston head, a resilient piston ring held within said groove, the exposed side of said ring being adapted to slidingly engage the inner surface of the cylinder wherein the said piston is to operate, the radial depth of said peripheral groove being such as to provide an annular oil chamber surrounding the rear side of said piston ring, a piston rod, a wrist pin providing a confined oil chamber therein and connecting the piston head to the piston rod, a plurality of passageways being formed in the hollow piston head connecting the said annular oil chamber to the oil chamber housed in said wrist pin, a one way check valve disposed in each of said passageways to allow the flow of oil therethrough into said annular oil chamber from said oil chamber housed in the wrist pin whereby the said annular oil chamber is filled with oil during operation of the piston, said valves locking a body of oil in said annular oil chamber to fill completely the latter when the pressure in the cylinder exceeds the pressure exerted on the body of oil contained in the chamber housed in the wrist pin, said body of oil contained in said annular chamber serving to lubricate with an oil film the inner surface of the cylinder wall when the gas pressure above the piston head forces oil through the clearance between the said piston ring and piston head, and a spray nozzle disposed on the upper end of said piston rod and within the said piston head, said nozzle being connected by a passageway with the body of oil housed in the oil chamber in said wrist pin whereby a cooling spray of oil is forced upon the inner surface of said hollow piston.

8. A piston construction comprising a hollow piston head having a peripheral groove formed on the exterior surface of the side wall of said piston head, a resilient piston ring held within said groove, the exposed side of said ring being adapted to slidingly engage the inner surface of the cylinder wherein the said piston is to operate, the radial depth of said peripheral groove being such as to provide an annular oil chamber surrounding the rear side of said piston ring, a hollow piston rod, a wrist pin providing a confined oil chamber therein and connecting the piston head to the piston rod, the hollow piston rod being in communication with the oil chamber in the wrist pin so that the body of lubricating oil of the associated engine will be forced by the pressure oil feed of the associated engine through said hollow piston rod into said oil chamber in the wrist pin, a plurality of passageways being formed in the hollow piston head connecting the said annular oil chamber to the said oil chamber housed in the wrist pin, and a one way check valve disposed in each of said passageways to allow the flow of oil therethrough into said annular oil chamber from said oil chamber housed in the wrist pin whereby the said annular oil chamber is filled with oil during the operation of the piston, said valves locking a body of oil to fill said annular oil chamber when the pressure in the cylinder exceeds the pressure exerted on the body of oil contained in the said chamber housed in the wrist pin, said body of oil contained in said annular chamber serving to lubricate with an oil film the inner surface of the cylinder wall when the gas pressure above the piston head forces oil through the clearance between the said piston ring and the piston head.

9. A piston construction comprising a hollow piston head having a peripheral groove formed on the exterior surface of the side wall of said piston head, a resilient piston ring held within said groove, the exposed side of said ring being adapted to slidingly engage the inner surface of the cylinder wherein the said piston is to operate, the radial depth of said peripheral groove being such as to provide an annular oil chamber surrounding the rear side of said piston ring, a piston rod, a wrist pin providing a confined oil chamber therein and connecting the piston head to the piston rod, a plurality of passageways being formed in the hollow piston head connecting the said annular oil chamber to the oil chamber housed in said wrist pin, a one way check valve disposed in each of said passageways to allow the flow of oil therethrough into said annular oil chamber from said oil chamber housed in the wrist pin whereby the said annular oil chamber is filled with oil during operation of the piston, said valves locking a body of oil in said annular oil chamber to fill completely the latter when the pressure in the cylinder exceeds the pressure exerted on the body of oil contained in the chamber housed in the wrist pin, said body of oil contained in said annular chamber serving to lubricate with an oil film the inner surface of the cylinder wall when the gas pressure above the piston head forces oil through the clearance between the said piston ring and piston head, a spray nozzle disposed on the upper end of said piston rod and within the said piston head, said nozzle being connected by a passageway with the body of oil housed in the oil chamber in said wrist pin whereby a cooling spray of oil is forced upon the inner surface of said hollow piston, and a spray nozzle disposed on the top of said piston rod and within the hollow piston head, said spray nozzle being in communication with the said oil chamber housed in the wrist pin.

10. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder wherein the piston is to operate, the radial depth of said peripheral groove being such as to provide an annular oil chamber surrounding the rear side of said piston ring, a wrist pin connecting said piston head to the piston rod of the engine, said wrist pin providing a confined chamber to house a body of lubricating oil therein which body of oil is in communication with the pressure oil feed of the engine, passageways being provided for communicating between the body of oil housed in said wrist pin and the body of oil in said annular oil chamber, and one way check valves housed in said passageways for confining the oil in said annular chamber when the gas pressure in the cylinder housing the piston exceeds the pressure of the oil housed in the said confined chamber in the wrist pin.

11. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder ring the piston is to operate, the radial depth of said peripheral groove being such as to provide an annular oil chamber surrounding the rear side of said piston ring, means for supplying a body of lubricating oil under pressure to fill said annular chamber, and means for locking the said body of oil in said annular chamber when the gas pressure above the piston head exceeds the pressure of said body of oil in said annular chamber, which gas pressure forces a film of lubricating oil from said annular chamber, through the clearance between the said piston ring and the piston head upon the inner surface of the cylinder wall.

12. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder wherein the piston is to operate, the radial depth of said peripheral groove being such as to provide an annular oil chamber surrounding the rear side of said piston ring, means for supplying a body of lubricating oil under pressure to fill said annular chamber, and means for locking the said body of oil in said annular chamber when the gas pressure above the piston head exceeds the pressure of said body of oil in said annular chamber, which gas pressure forces a film of lubricating oil from said annular chamber through the clearance between the said piston ring and the piston head upon the inner surface of the said cylinder, said piston head being provided with a second peripheral groove below said first peripheral groove wherein the piston ring is received, said second peripheral groove having inwardly slanting side walls and being provided with spaced downwardly slanting drain openings that communicate with the interior of the piston head so that the lubricating oil scraped from the cylinder by said piston ring will flow through said drain openings into the interior of the piston head.

13. The combination defined in claim 12 wherein the upper edge of the said piston ring is rounded or beveled so that on the upward stroke of the piston, the said piston ring will glide on the oil film on the inner surface of the cylinder to minimize the amount of lubricating oil that may be pushed up into the combustion space of the cylinder.

14. The combination defined in claim 12 wherein the lower edge of the said piston ring is sharp so as to act as an oil scraper on the downstroke of the piston head and scrape off excess oil from the inner surface of the cylinder and return such excess oil to the engine crankcase through said drain holes.

15. The combination defined in claim 12 wherein the upper edge of the said piston ring is rounded or beveled and the lower edge of said piston ring is sharp.

16. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder wherein the piston is to operate, the radial depth of said peripheral groove being such as to provide an annular oil chamber surrounding the rear side of said piston ring, means for supplying a body of lubricating oil under pressure to fill said annular chamber, and means for locking the said body of oil in said annular chamber when the gas pressure above the piston head exceeds the pressure of said body of oil in said annular chamber, which gas pressure forces a film of lubricating oil from said annular chamber through the clearance between the said piston ring and the piston head upon the inner surface of the said cylinder, and said annular oil chamber being so proportioned that a body of lubricating oil remains contained therein after a discharge of the combustion gases from said cylinder.

17. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder wherein the piston is to operate, the radial depth of said peripheral groove being such as to provide an annular oil chamber surrounding the rear side of said piston ring, means for supplying a body of lubricating oil under pressure to fill said annular chamber, and means for locking the said body of oil in said annular chamber when the gas pressure above the piston head exceeds the pressure of said body of oil in said annular chamber, which gas pressure forces a film of lubricating oil from said annular chamber through the clearance between the said piston ring and the piston head upon the inner surface of the said cylinder, and said annular oil chamber being so proportioned that during a power stroke of the piston the body of lubricating oil housed in said chamber is sufficient to cushion the said piston ring so that the hammering of the latter against the sides of the groove receiving said piston ring will be minimized when said piston ring changes positions during operation of the piston.

18. In an internal combustion engine lubricated by oil under pressure, a piston construction comprising a piston head having a peripheral groove formed on the exterior surface thereof, a piston ring disposed within the groove, the resiliency of said ring urging it radially outward to allow the exposed side of said ring to slidingly engage the inner surface of the cylinder wherein the piston is to operate, the radial depth of said peripheral groove being such as to provide an annular oil chamber surrounding the rear side of said piston ring, means for supplying a body of lubricating oil under pressure to fill said annular chamber, and means for locking the said body of oil in said annular chamber when the gas pressure above the piston head exceeds the pressure of said body of oil in said annular chamber, which gas pressure forces a film of lubricating oil from said annular chamber through the clearance between the said piston ring and the piston head upon the inner surface of the said cylinder, said piston ring being rounded or beveled at its upper outer edge and its lower outer edge being of square shape.

RASMUS M. HVID.